March 8, 1966  H. BOSCH  3,238,593

THREAD STRETCHING DEVICE

Filed March 12, 1964

INVENTOR.
HUGO BOSCH
BY Bair, Freeman
& Molinare
Attys

United States Patent Office 3,238,593
Patented Mar. 8, 1966

3,238,593
THREAD STRETCHING DEVICE
Hugo Bosch, Offenbach (Main), Germany, assignor to Hans J. Zimmer Verfahrenstechnik, Frankfurt am Main, Germany
Filed Mar. 12, 1964, Ser. No. 351,292
Claims priority, application Germany, Apr. 3, 1963, Z 10,034
13 Claims. (Cl. 28—71.3)

This invention relates to an improved apparatus or device for stretching or elongating endless threads, fiber cables, material webs and the like.

Threads, fiber cables, material webs and the like, which can be generally designated as fibers, may be improved in their physical properties or characteristics by being stretched, whereby there is a permanent alignment of the molecules of the stretched material. Apparatus useful for accomplishing this stretching ordinarily includes at least two roller systems, which are in spaced relationship; the stretching occurs between two rollers which are driven at different circumferential speeds. The continuous fibrous material encircles the heated and/or unheated stretching rollers of the two roller systems, whereby the material adheres to the rollers as a result of the friction therebetween.

If only a small amount of stretching is desired, the encircling friction itself provides a suitable stretching force. However, if the material is to be stretched a relatively larger amount, a higher stretching force is required; under these circumstances, contact pressure rollers are provided for bearing against the stretching rollers. This constructions forms clamping points for the fibers on the rollers and considerably increases the stretching force. A disadvantage of this construction is that the pressure rollers require considerable contact pressure; this increases the cost of the apparatus and it is highly subject to malfunction. The high contact pressure, increases the wear on the bearings and the roller surfaces. These problems are greatly increased when several pressure rollers are used in a roller system. Also, a multiple arrangement of contact pressure rollers is expensive both in material and in adjusting work.

In order to overcome the above disadvantages, there has been provided a roller system wherein a stretching roller is swingably mounted and is pressed on two stationary rollers. By this arrangement, a single swingable driven roller is used in conjunction with two stationary driven rollers, whereby two clamping points are provided on the outer periphery of the swingably mounted roller. Although this construction accomplishes the high stretching forces required for substantial stretching ratios, in actual practice it is extremely difficult to achive line contact at the clamping area between the swingable roller and the stationary rollers, since line contact is accomplished only by an axially parallel arrangement of the three rollers. Even slight deviations from the required parallel arrangement of the three roller axes, which frequently occurs in the case of the swingable roller, prevents line contacts between the swingably mounted roller and the stationary rollers. In this construction, a subsequent adjustment is difficult if not impossible to make, since the mounting of the swingable roller on a frame by means of a lever arm is accomplished by fixed bearing points. Although devices are known whereby a lever could be pivotably carried by an adjustable pivot pin, the adjusting devices are expensive and require considerable maintenance, since they frequently move out of position during operation as a result of the contact pressure forces.

It is therefore an important object of this invention to provide an improved thread stretching device which substantially avoids the aforementioned disadvantages of prior art devices.

It is also an object of this invention to provide a thread stretching device having a swingable roller which is elastically mounted, whereby the swingable roller is adapted to bear against two stationary rollers under line contact with each roller without the necessity of precision adjustments to accomplish this end purpose.

It is a further object of this invention to provide a thread stretching device wherein the clamping points between two stretching rollers and a swingable roller are self-adjusting.

It is another object of this invention to provide an improved thread stretching device wherein a swingable roller is mounted on a lever arm which engages an elastic layer or a bearing pivot on the frame of the device.

It is still another object of this invention to provide an improved thread or fiber stretching device which is characterized by its simplicity and economy of construction.

Further purposes and objects of this invention will appear as the specification proceeds.

A particular embodiment of the present invention is illustrated in the accompanying drawings, wherein.

Figure 1:
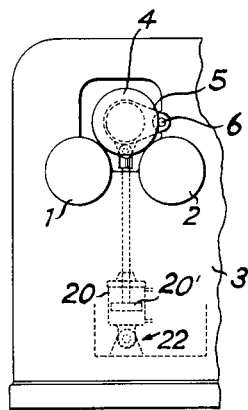
FIGURE 1 is a fragmentary, front elevational view of my thread stretching roller system.
Figure 3:
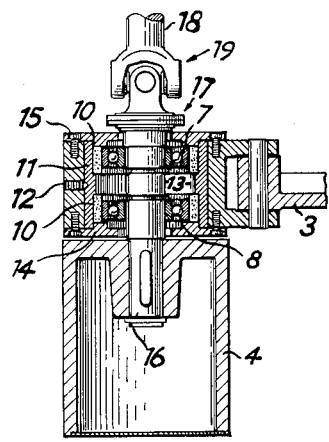
FIGURE 3 is a sectional view of the embodiment of FIGURE 2, except an alternate embodiment of the bearing is shown.

Referring to FIGURE 1, the stretching roller system includes two fixedly mounted, driven stretching rollers 1 and 2, which are rotatably carried by the machine frame 3. The stationary or fixed rollers 1 and 2 form with a stretching roller 4, mounted to swing over them, a three roller system, which is usable as such or in the framework of a multiple roller system, for example, a seven roller system, within a fiber band train. The swingable roller 4 is swingably or pivotably carried by means of a one-armed lever 5 and a pivot bearing pin 6 in the machine frame 3. The swingable end of the one-armed lever 5 forms, as seen in FIGURE 3, an outer bearing support for the bearing system, which includes roller bearings 7 and 8 of the swingable stretching roller 4. The roller bearings may also be positioned within the stretching roller 4, wherein the lever arm 5 would carry a fixed bearing pin on its roller end; the bearing pin would be made hollow in order to accommodate the drive shaft for the swingable roller 4.

Figure 2:
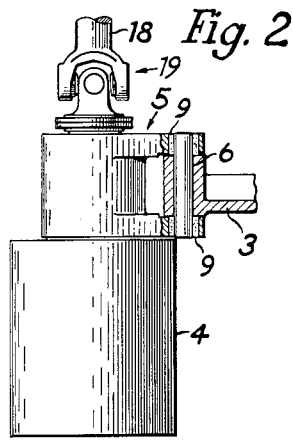
FIGURE 2 is an enlarged, top plan view of the swingable roller.

Referring to FIGURE 2, the elastic bearing which provides movement of the roller 4 in all directions, is shown. The one-armed lever 5 is elastically carried on its end which is at the machine frame 3. For this purpose, the forked lever 5 is pivotably mounted over rubber elastic interlayers 9 provided on the stationary bearing pin 6.

In FIGURE 3, the elastic mounting of the swingable roller 4 is accomplished in the region of the roller bearing system. The outer rings or races of the roller bearings 7 and 8 are carried by elastic sleeeves 10, which are positioned on the inner wall of an insertion sleeve 11. The sleeve 11 is fixedly mounted in the roller end of the lever 5. Movement of the sleeve 11 is prevented by suitable means, as the set screw 12. The roller bearings 7 and 8 and the elastic intermediate sleeves 10 are fixed in position by an annular shoulder 13 located within the insertion sleeve 11 and by cover flanges 14, which are attached to the lever 5 by screws 15.

A drive shaft 16 for the swingable roller 4 extends into the swingable roller 4 and is fixed to the roller 4 by suitable means. The driving end of shaft 16 is operatively connected to a jointed shaft 18 by a flange connection 17 and by a universal joint 19. The jointed shaft 18 is also coupled at its other end (not shown) with a universal joint and to a drive means.

Figure 4:
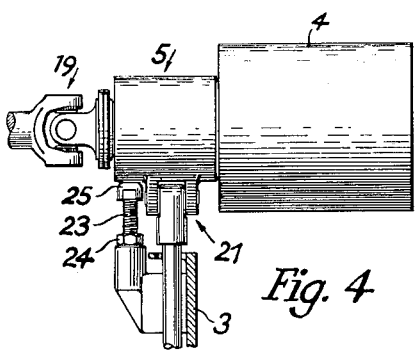
FIGURE 4 is a side elevational view of the embodiment of FIGURE 2.

A pneumatic or hydraulic cylinder 20 and piston 20' presses the swingable stretching roller 4 against the stationary stretching rollers 1 and 2. The piston 20' is connected to a piston rod which in turn is pivotably connected to a bearing 21 provided on the lever 5, as shown in FIGURE 4. The cylinder 20 is articulated on the frame 3 by a pivot bearing 22. The contact pressure provided may be varied by a suitable regulating device and may be read on an indicator instrument. The movement of the stretching roller 4 is accomplished through the pneumatic or hydraulic system 20, 20' in two directions, whereby the swinging stretching roller 4, may be lifted from the stationary rollers 1 and 2 for applying the fibers thereon. The elastic bearing of the swingable roller 4 causes, through the contact pressure, a torque on the pivot bearing 21; in order to avoid the tilting of the roller 4, a counter bearing or abutment is provided. The abutment, shown in FIGURE 4, is arranged to support the lever 5 near the roller 4 but on the side opposite the pivot bearing 21. The abutment includes a bolt 23 which is screwed into the machine frame 3, and it is secured in place by a nut 24. The head 25 of the bolt 23 may be either elastic or not, as for example, it may be made of a metal or a rubber elastic material.

The abutment can also be used, by suitable elevational adjustment, for limiting the contact pressure acting on the fibers. Also, it is capable of suppressing vibrations of the roller 4 arising for example from the drive means.

The elastic bearing of the roller 4 may be accomplished in a manner different from those shown in FIGURES 2 and 3. Thus, either alone or in combination with the construction described above, it is possible to provide elastic support in the interior of the stretching rollers. The intermediate space, for example, between the drive shaft 16 and the stretching roller 4, may be filled with a rubber elastic material; the attachment of such material to the shaft and roller makes it possible to transmit greater drive torques. The attachment may be accomplished in a suitable manner, as by polymerization and/or vulcanization of suitable materials. The swingable stretching roller 4 may be arranged so that it rotates about a fixed hollow axis, through which the drive shaft is conducted, a suitable connection being provided for the roller. The hollow axis, inturn, may be mounted on intermediate bearings, with elastic supports on the lever, whereby the uni-directional elastic bearing for the roller 4 can be achieved. Also, in the use of the hollow axis described, the elastic support may lie both on the inside and on the outer rings of the roller bearings. The elastic supporting of the roller bearings may be made of a uniform piece or can be installed separately for each bearing. Both the inside and the outside rings of the roller bearings may be elastically supported. The elastic supporting in the interior of the stretching roller 4 may also be combined with the rubber elastic bearing of the one-armed lever, in the manner shown in FIGURE 2.

The various elastic bearing materials may be made of rubber. Advantageously, silicon elastomers are provided in order to avoid impairment of operation through aging of the rubber elastic bearing by heat, oil, and other harmful influences.

While in the foregoing there has been provided a detailed description of particular embodiments of the present invention, it is to be undestood that all equivalents obvious to those having skill in the art are to be included within the scope of the invention, as claimed.

What I claim and desire to secure by Letters Patent is:

1. For use with a material stretching device comprising a frame and a pair of rotatably mounted rollers on said frame, the improvement comprising a swingable mounted roller, elastic members for receiving said swingably mounted roller whereby said swingable roller is adapted to bear against the outer peripheries of each roller of said pair of rollers to thereby provide clamping contact with each roller of said pair of rollers.

2. A material stretching device comprising a frame, two rotatably mounted rollers mounted on said frame, and a swingable roller, elastic members for receving said swingable roller, said swingable roller being adapted to bear against the outer peripheries of each of said two rollers to thereby provide for adjustment of the contact pressure between said swingable roller and said stationary rollers.

3. The device of claim 2 wherein said roller is rotatably carried by a swingable lever arm which is received by said elastic members.

4. A material stretching device comprising a frame, two rollers rotatably carried by said frame, a pivot pin mounted on said frame, a swingable lever, elastic members mounted on said frame for receiving, said pivot pin, and a roller rotatably mounted on said lever, said roller being adapted to act against the outer peripheries of each of said two rollers whereby two clamping contacts are provided between said rollers during the stretching of said material.

5. The device of claim 4 wherein said elastic members comprise elastic sleeves which are positioned between said pivot pin and said lever arm.

6. A material stretching device comprising a frame, two rollers rotatably carried by said frame, a lever pivotably carried by said frame, a roller rotatably carried by said lever member, and elastic members mounted on said lever for receiving said rotatable roller whereby said swingable roller is adapted to bear against the outer peripheries of said two rollers so as to provide for adjustment of the clamping pressure therebetween.

7. The device of claim 6 wherein the roller carried by said lever is rotatably driven by a drive shaft and bearing members and resilient sleeves are mounted intermediate said drive shaft and said lever.

8. The device of claim 7 wherein drive means are connected to said drive shaft by means of a jointed shaft.

9. A fiber stretching device comprising a frame, two rollers rotatably carried by said frame, a swingably mounted roller, elastic members for receiving said roller, said roller bearing against the outer peripheries of said two rollers in order to clamp fiber therebetween, and means for moving said roller towards and away from said two rollers.

10. The device of claim 9 wherein said moving means includes a pressure cylinder and piston.

11. A fibrous material stretching device comprising a frame, two fixed rollers rotatably mounted on said frame, a lever swingably mounted on said frame, elastic members mounted on said frame for receiving said lever, a roller rotatably mounted on said lever and being adapted to bear against the outer peripheries of said fixed rollers in order to provide clamping points for said material, and pressure cylinder means for moving said last mentioned roller toward and away from said fixed rollers.

12. The device of claim 11 wherein said cylinder means includes a piston rod which is pivotably carried by said lever and said cylinder is pivotably mounted on said frame.

13. The device of claim 12 wherein said last mentioned roller is supported in an upright direction by means of an elevationally adjustably abutment member supported on said frame.

References Cited by the Examiner

UNITED STATES PATENTS

| | | | |
|---|---|---|---|
| 1,161,394 | 6/1939 | Waters | 28—71.4 |
| 2,621,390 | 12/1952 | Nield | 28—71.3 |
| 2,728,973 | 1/1956 | Kummel | 28—71.3 |
| 2,955,342 | 10/1960 | Litzler et al. | 26—54 |
| 2,968,055 | 1/1961 | Linderoth | 308—238 X |
| 3,018,143 | 1/1962 | Masser | 308—238 X |
| 3,020,104 | 2/1962 | Nichols | 308—238 X |

FOREIGN PATENTS 875,770  8/1961  Great Britain.

DONALD W. PARKER, *Primary Examiner.*

L. K. RIMRODT, *Assistant Examiner.*